(12) United States Patent
Liu

(10) Patent No.: US 8,443,657 B2
(45) Date of Patent: May 21, 2013

(54) RADIATOR GRILLE TESTER

(75) Inventor: Lai-Cheng Liu, Taichung (TW)

(73) Assignee: Cosda Manu Facturing Company, Taichung (TW)

( * ) Notice: Subject to any disclaimer, the term of this patent is extended or adjusted under 35 U.S.C. 154(b) by 52 days.

(21) Appl. No.: 13/210,793

(22) Filed: Aug. 16, 2011

(65) Prior Publication Data

US 2013/0042675 A1   Feb. 21, 2013

(51) Int. Cl.
   *G01M 15/04*   (2006.01)
(52) U.S. Cl.
   USPC ........................................ 73/114.68
(58) Field of Classification Search
   USPC ........................................ 73/114.68
   See application file for complete search history.

(56) References Cited

U.S. PATENT DOCUMENTS

| | | | | |
|---|---|---|---|---|
| 2,018,403 A | * | 10/1935 | Hussar | 73/114.68 |
| 3,583,210 A | * | 6/1971 | Orr | 73/49.2 |
| 3,623,372 A | * | 11/1971 | Markey | 73/49.7 |
| 3,694,934 A | * | 10/1972 | Barton | 434/373 |
| 4,235,100 A | * | 11/1980 | Branchini | 73/49.7 |
| 4,682,493 A | * | 7/1987 | Tenenbaum | 73/114.68 |
| 5,526,871 A | * | 6/1996 | Musser et al. | 165/11.1 |
| 7,614,283 B2 | * | 11/2009 | Allen et al. | 73/49.7 |
| 7,992,600 B2 | * | 8/2011 | Liu | 141/65 |
| 2002/0088274 A1 | * | 7/2002 | Oka et al. | 73/118.1 |
| 2002/0157460 A1 | * | 10/2002 | Ford | 73/118.1 |
| 2006/0075804 A1 | * | 4/2006 | Kang | 73/40 |

* cited by examiner

*Primary Examiner* — Freddie Kirkland, III
(74) *Attorney, Agent, or Firm* — Banger Shia

(57) ABSTRACT

A radiator grille tester of the present invention includes two adapters, a transparent tube, and a detector. The transparent tube and the detector are located between the adapters. The adapters, the transparent tube, and the detector are serial connected and define a channel. The adapters can be connected to an engine and a radiator respectively. Therefore, water in the engine and the radiator can flow passing through the transparent tube and the detector via the adapter. User can observe the water flow directly so as to check whether the engine and the radiator are malfunctioned. Observation and examination procedures are simplified.

7 Claims, 6 Drawing Sheets

RADIATOR GRILLE TESTER

BACKGROUND OF THE INVENTION

1. Field of the Invention

The present invention relates to an automobile overhauling device, and more particular to a tester which is used for overhauling the engine, the radiator, and the tubes therebetween.

2. Description of the Prior Art

Conventional engine 101, as shown in FIG. 6, is connected to grille 102 by tubes 103 directly. The tubes 103 are usually made by metal, and the engine and the grille are metal, too. After a long period of using, the tubes would probably rust, or even break. Thus, engine, grille, and the tubes checking and testing should be included in automobile overhauling procedure.

Conventional radiator grille tester, as shown in TW utility model TWM354734, is provided for connecting an engine to a radiator. Water of the engine and the radiator can flow into the tester. Servicemen can observe the water with the tester via a window of the tester. Further, the tester can detect temperature of the water. Thus, servicemen can judge whether the engine and the radiator is malfunctioned with the tester.

However, the tester mentioned above still has several disadvantages in practical using. When servicemen observe color of the water, the top viewing window is too small to observe the water clearly. Further, servicemen can hardly judge whether water is flowing or not. Therefore, obstruction of the tube, the radiator, or the engine can hardly be detected.

The present invention is, therefore, arisen to obviate or at least mitigate the above mentioned disadvantages.

SUMMARY OF THE INVENTION

The main object of the present invention is to provide another tester which is provided for observing status of the engine, the radiator, and the tubes easily and clearly.

To achieve the above and other objects, a radiator grille tester of the present invention is used for connecting an engine to a radiator. The radiator grille tester includes a main body.

The main body has a water channel. The main body has two adapters, a transparent tube, and a detector. The adapters are located at two ends of the channel respectively. The channel is defined in the transparent tube and the detector. One of the adapters is adapted for the engine to connect thereto. The other one of the adapters is adapted for the radiator to connect thereto, so that water is able to flow from the engine to the channel via one of the adapters, flow passing through the transparent tube and the detector, and flow from the channel to the radiator via the other one of the adapters.

Further, the detector has at least one sensor. The sensor is adapted for showing one of temperature of the water and inner pressure of the channel.

The present invention will become more obvious from the following description when taken in connection with the accompanying drawings, which show, for purpose of illustrations only, the preferred embodiment(s) in accordance with the present invention.

BRIEF DESCRIPTION OF THE DRAWINGS

FIG. 2A is a stereogram showing a connection tube of a preferred embodiment of the present invention;

DETAILED DESCRIPTION OF THE PREFERRED EMBODIMENTS

Figure 1:
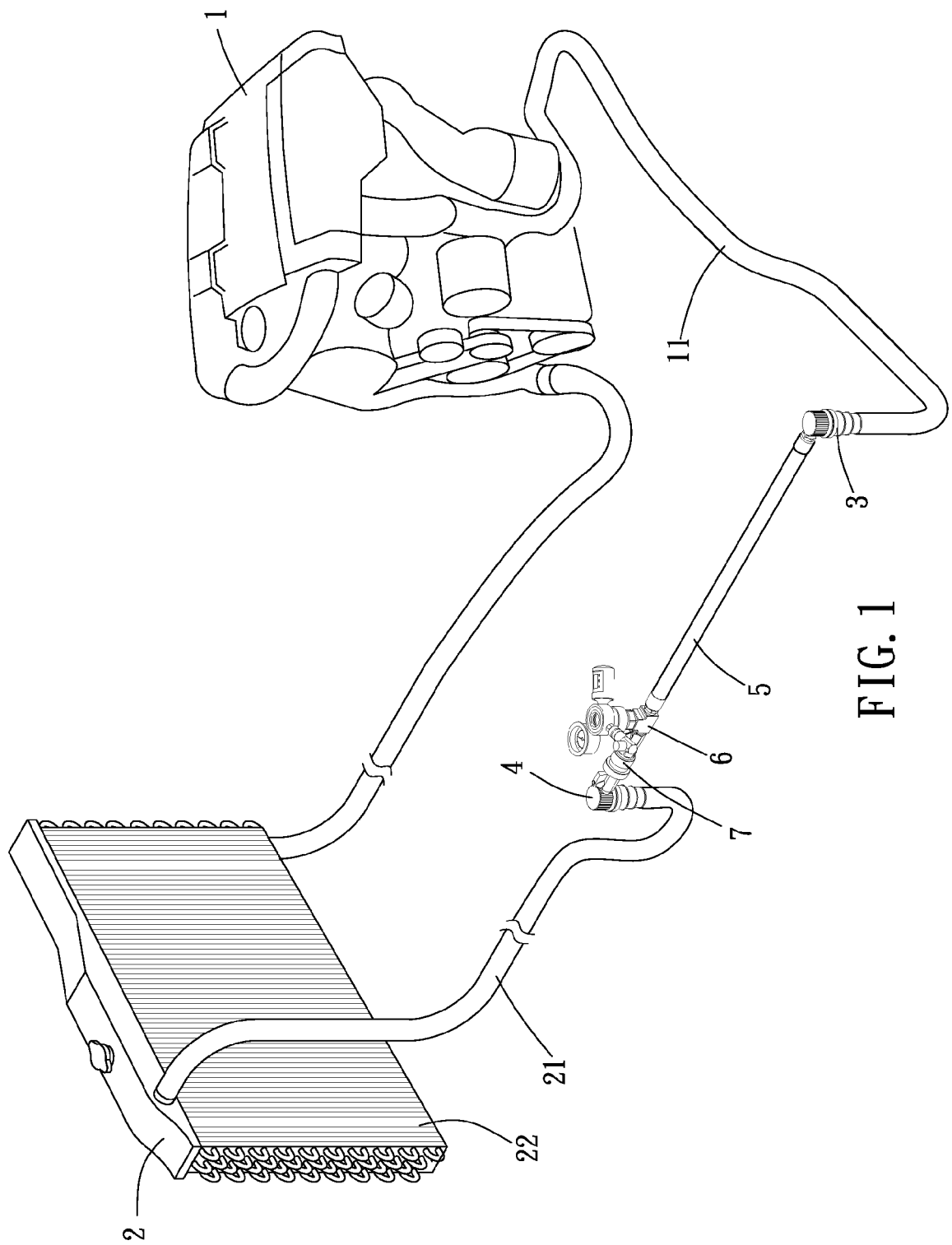
FIG. 1 is a schematic drawing showing a connection condition of a preferred embodiment of the present invention.
Figure 2:
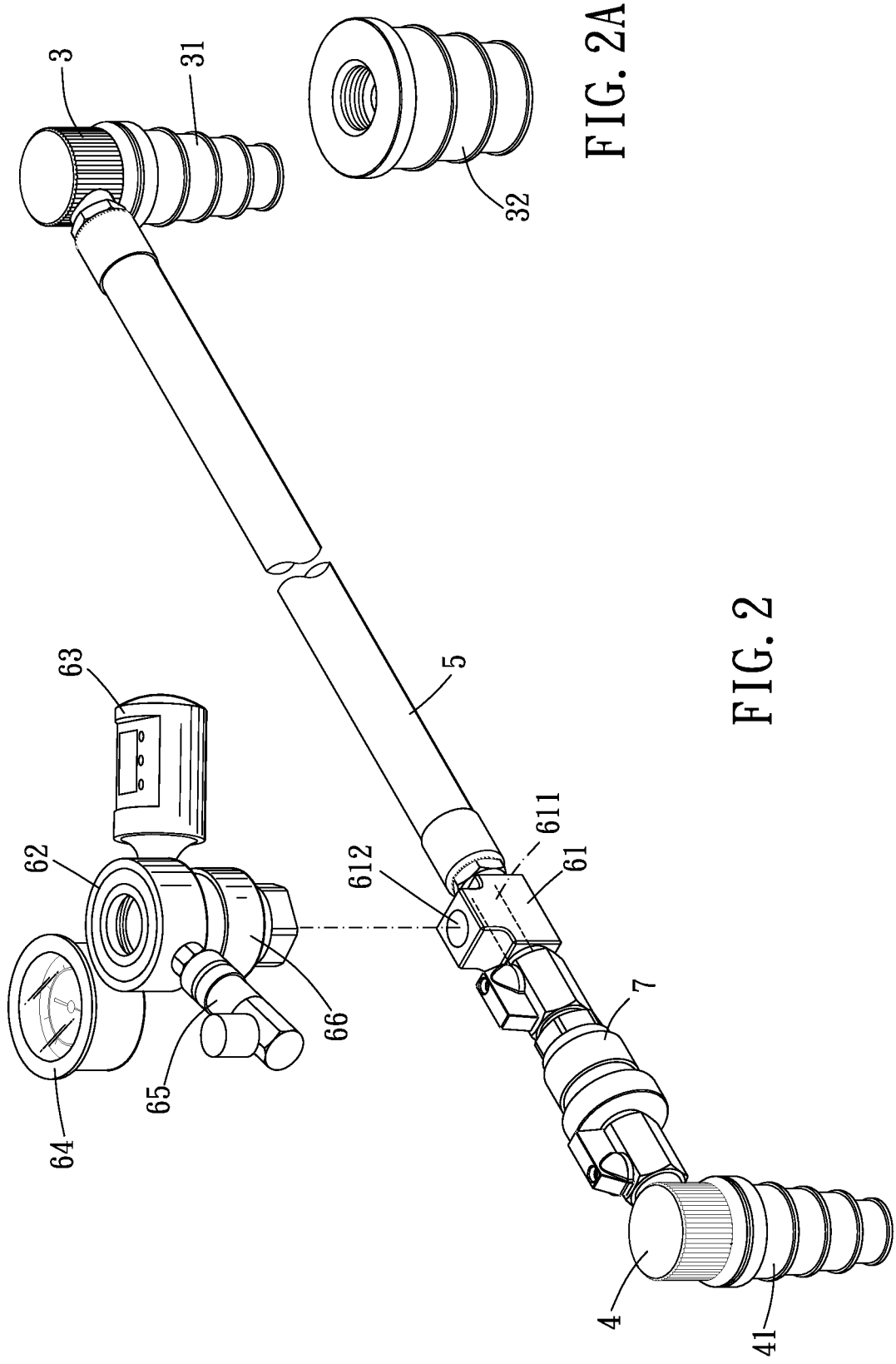
FIG. 2 is a stereogram showing a preferred embodiment of the present invention.
Figure 3:
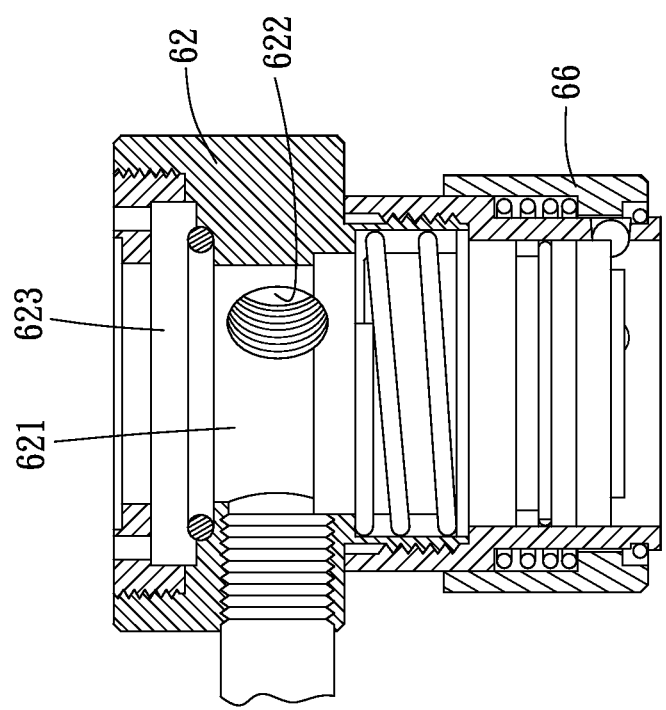
FIG. 3 is a profile showing a base portion and a head portion of a preferred embodiment of the present invention.

Please refer to FIG. 1 to FIG. 3 for a preferred embodiment of the present invention. The radiator grille tester of the present embodiment is used for connecting an engine 1 to a grille 2 by tubes 11, 12. The radiator 2 may have a heat dispenser 22. Thus, water in the engine 1 can flow into the radiator 2 via the radiator grille tester. The radiator grille tester includes a main body.

The main body includes two adapters 3, 4, a transparent tube 5, and a detector 6. Preferably, a quick release joint 7 is also included.

The transparent tube 5 connects one adapter 3 to the detector 6. The quick release joint 7 connects the other one adapter 4 to the detector 6. The main body has a channel. More particularly, the channel extends from the adapter 3 to the other adapter 4, passing through the transparent tube 5, the detector 6, and the quick release joint 7. The adapters 3, 4 are located at two ends of the channel. The transparent tube 5 may be made by plastic of the similar material, so that the transparent tube 5 is capable of being bent. Further, user can observe the water in the channel with the transparent tube 5.

The adapters 3, 4 are connected to the engine 1 and the grille 2 by the tubes 11, 12 respectively. More particularly, one adapter 3 is provided for the engine 1 to connect thereto. The other adapter 4 is provided for the radiator 2 to connect thereto. Thus, water is able to flow from the engine 1 to the channel via one adapter 3, flowing passing through the transparent tube 5 and the detector 6, and flow from the channel to the radiator 2 via the other adapter 4. Since the transparent tube 5 is contained in the main body, water flow in the channel would show up in the transparent tube 5. Thus, user can check the water flow easily. Preferably, each of the adapters 3, 4 has a detachable connection tube 31, 41. User can exchange the connection tubes 31, 41 with a larger one 32, as shown in FIG. 2A, or a smaller one.

The quick release joint 7 connects the detector 6 to the adapter 4. In other possible embodiments of the present invention, the quick release joint may be disposed between the detector 6 and the transparent tube 5 or between the transparent tube 5 and the adapter 3. The quick release joint 7 is provided for being decomposed selectively, so that the main body is partitioned into an engine portion, which is connected to the engine, and a radiator portion, which is connected to the radiator. Simultaneously, the channel is partitioned into a sub-channel of the engine and a sub-channel of the radiator portion.

The detector 6 includes a base portion 61, a head portion 62, and two sensors 63, 64. The detector 6 can further include a compression head 65 and another quick release joint 66. The base portion 61 has a hole 611 and an opening 612. The opening 612 communicates laterally with the hole 611. Laterally communication means that axis of the opening 312 is not parallel to axis of the hole 611. In the present embodiment, the hole 611 extends horizontally, and the opening 612 extends vertically. The head portion 62 is formed with a chamber 621 therein and several connection apertures 622 communicating with the chamber 621 respectively. More particularly, there are three connection apertures 622 in the present embodiment, as shown in FIG. 2 and FIG. 3. Each of the connection apertures 622 communicates with the chamber 621. The connection apertures 622 are threaded. The head portion 62 may further have a transparent window 623. Thus, user can observe into the chamber 621 via the transparent window 623. One sensor 63 is a temperature sensor so as to sense and display the temperature of the chamber 621. The other sensor 64 is a pressure sensor so as to sense and display the pressure of the chamber 621. It is noted that water in the chamber would flow into the chamber 621 via the opening 612 and the hole 611, so that temperature and pressure of the chamber 621 would almost equal to temperature and pressure of the water in the channel. For describing purpose, it is considered that temperature and pressure of the chamber is namely temperature and pressure of the water in the channel. The sensors 63, 64 are disposed on the head portion 62 and are located in the connection apertures 622 respectively. Temperature and pressure detection of the sensors 63, 64 can be progressed toward the chamber 621 via the connection apertures 622. Thus, temperature and pressure of the chamber or the channel can be displayed or shown up.

In the preferred embodiment of the present invention, one sensor 63 may has a lighting device, such as LED. The sensor 63 can project light into the chamber 621. As such, user can also observe the water in the chamber 621 via the transparent window 623. The compression head 65 is disposed on the head portion 62, and is located at one of the connection apertures 622. User can inject fluid with a compressor into the chamber 621 via the compression head 65 so as to raise pressure of the chamber 621. The quick release joint 66 connects the head portion 62 to the base portion 61, so that the opening is connected to the chamber. The quick release joint 66 is used for decomposing, so that the head portion 62 can be detached from the base portion 61.

Accordingly, the radiator grille tester can be assembled between the engine 1 and the radiator 2, connecting the engine 1 to the radiator 2, as shown in FIG. 1. User can overhaul the engine, the radiator, and the tubes by using the radiator grille tester. Firstly, user can check flow and color of the water to know whether the tubes are ruptured, obstructed, or rusted.

Figure 4:
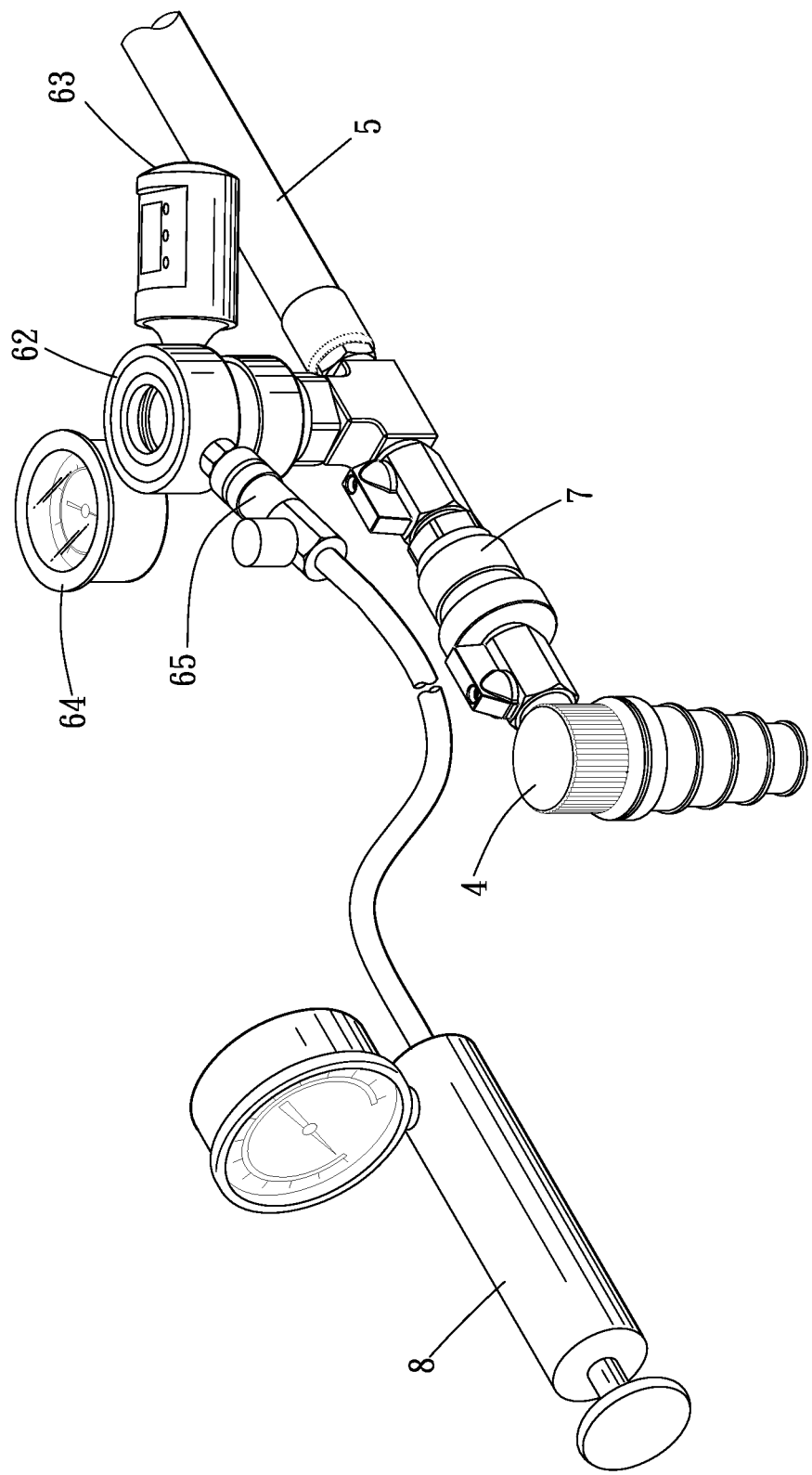
FIG. 4 is a schematic drawing showing a compression condition of a preferred embodiment of the present invention.

Secondly, user can connect the compression head 65 to a compressor, such as a cylinder 8 shown in FIG. 4. Air or water is injected into the chamber so as to raise pressure of the chamber. User can read the pressure on the sensor 64 then. If value of the pressure can be maintained, tubes, engine, and the radiator may be kept well without rupture. Otherwise, if value of the pressure decreases rapidly, tubes, engine, and the radiator would probably ruptured.

Figure 5:
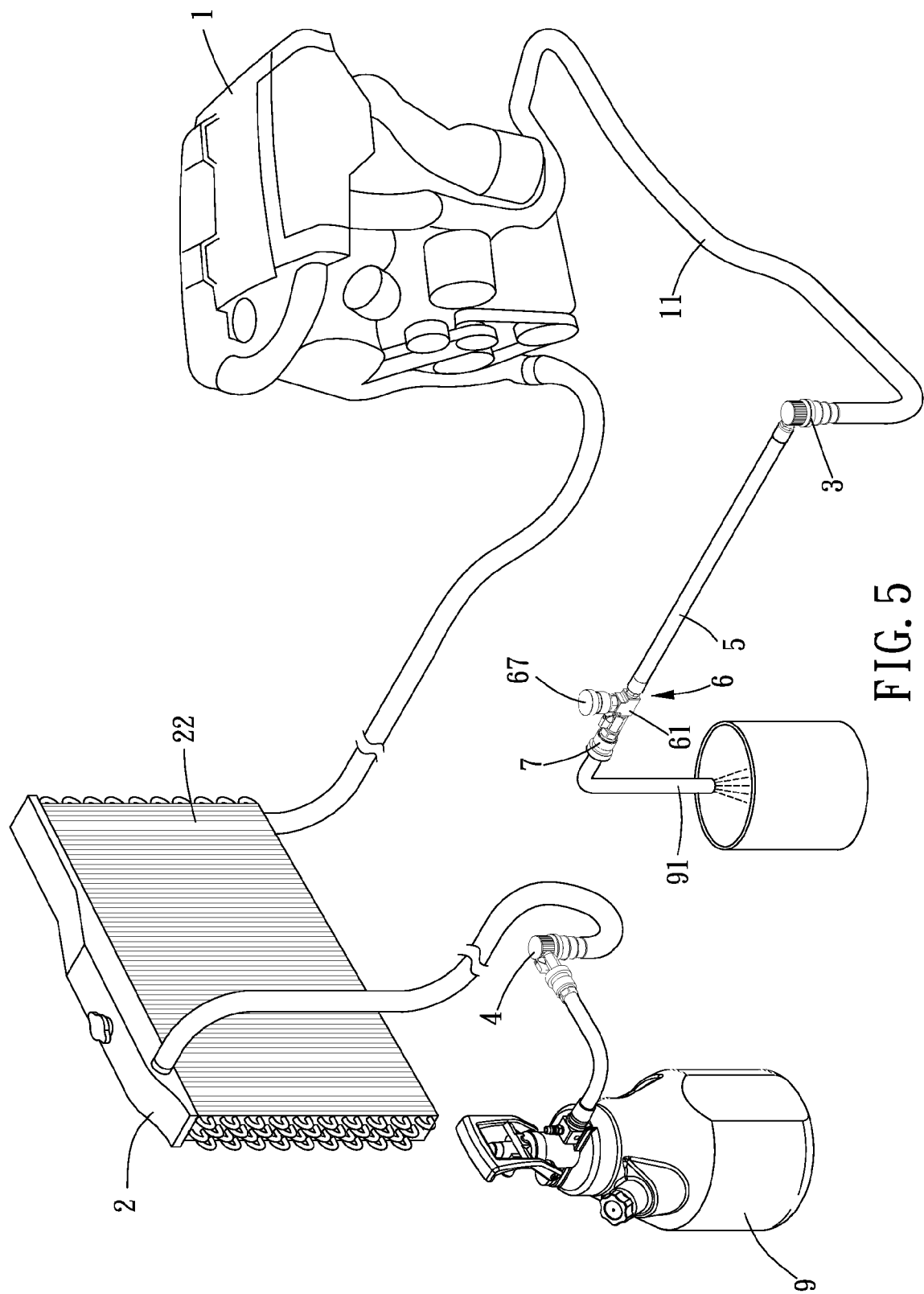
FIG. 5 is a schematic drawing showing a water exchanging condition of a preferred embodiment of the present invention.
Figure 6:
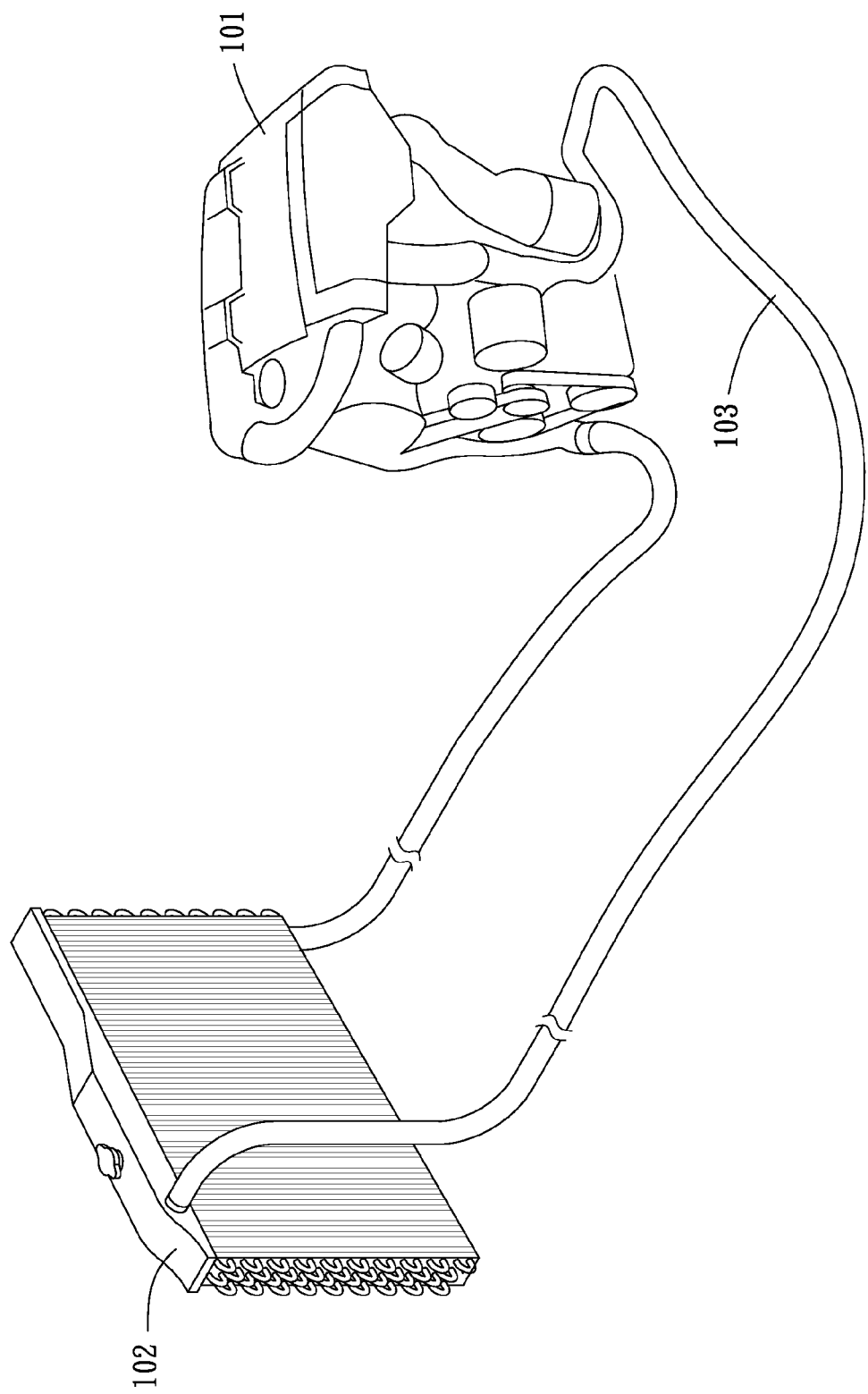
FIG. 6 is a schematic drawing showing a connection condition of a conventional engine and a conventional grille.

Tube rupture would follow with engine oil leakage. Water in engine would be contaminated by the engine oil. Thus, water in the engine and the radiator should be exchanged. Please refer to FIG. 5. User can decompose the quick release joint 7, connect the adapter 4 to a water pump 9, and connect the quick release joint 7 to a tube 91. The water pump 9 is then started. Contaminated water would be expelled out from the radiator 2 and the engine 1, and the water in engine is then refreshed.

To conclude, the radiator grille tester of the present invention can be used in automobile overhauling, making overhauling easier and quicker.

What is claimed is:

1. A radiator grille tester, being adapted for connecting an engine to a radiator, the radiator grille tester comprising:

a main body, having a water channel, the main body having two adapters, a transparent tube, and a detector, the adapters being located at two ends of the channel respectively, the channel being defined in the transparent tube and the detector, one of the adapters being adapted for the engine to connect thereto, the other one of the adapters being adapted for the radiator to connect thereto, so that water is able to flow from the engine to the channel via one of the adapters, flow passing through the transparent tube and the detector, and flow from the channel to the radiator via the other one of the adapters;

wherein the detector has at least a sensor, the sensor is adapted for showing one of temperature of the water and inner pressure of the channel;

wherein one end of the transparent tube is connected directly to one of the adapters;

wherein the detector comprises a base portion, a head portion and the sensor, the head portion is detachably connected to the base portion, the base portion has a hole and an opening, the opening extends laterally and communicates with the hole, the head portion is formed with a chamber and a connection aperture communicating with the chamber, the chamber communicates with the opening, the sensor is disposed on the head portion, the sensor is located in the connection aperture, the sensor is adapted for sensing and displaying one of temperature and pressure of the chamber;

wherein the detector further comprises a compression head, the head portion has another connection aperture communicating with the chamber, the compression head is disposed on the head portion, the sensor and the compression head is located in one of the connection apertures respectively, the compression head is adapted for a compressor to inject fluid into the chamber so as to raise pressure of the chamber;

wherein the head portion further comprises a transparent window for observation into the chamber.

2. The radiator grille tester of claim 1, wherein the transparent tube connects one of the adapters to the detector.

3. The radiator grille tester of claim 1, wherein the radiator grille tester further comprises a quick release joint, the quick release joint connects one of the adapters to the detector, the quick release joint is adapted for decomposing, so that the main body is partitioned into an engine portion and a radiator portion, and the channel is partitioned into a sub-channel of the engine portion and a sub-channel of the radiator portion.

4. The radiator grille tester of claim 1, wherein the detector further comprises another quick release joint, the quick release joint of the detector connects the head portion to the base portion, the quick release joint of the detector is adapted for decomposing, so that the head portion is able to be detached from the base portion.

5. The radiator grille tester of claim 1, wherein the sensor has a light device which can project light into the chamber.

6. The radiator grille tester of claim 1, wherein each one of the adapter has a detachable connection tube.

7. The radiator grille tester of claim 1, further comprising a compressor which is selectively connected to the compression head.

* * * * *